US007631094B1

(12) United States Patent
Motoyama

(10) Patent No.: US 7,631,094 B1
(45) Date of Patent: Dec. 8, 2009

(54) TEMPORARY STORAGE OF COMMUNICATIONS DATA

(75) Inventor: Satoru Motoyama, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 985 days.

(21) Appl. No.: 09/037,822

(22) Filed: Mar. 10, 1998

(30) Foreign Application Priority Data

Mar. 13, 1997 (JP) ........................... HEI 9-059602

(51) Int. Cl.
*G06F 15/16* (2006.01)
*G06F 17/00* (2006.01)

(52) U.S. Cl. ........................................ 709/231; 700/84

(58) Field of Classification Search ................. 709/213, 709/216, 219, 231, 234; 710/53, 56, 57; 700/94
See application file for complete search history.

(56) References Cited

U.S. PATENT DOCUMENTS 4,057,785 A * 11/1977 Furniss et al.
4,458,316 A * 7/1984 Fry et al.
4,467,411 A * 8/1984 Fry et al.
4,616,271 A * 10/1986 Yasukawa et al.
5,133,015 A * 7/1992 Scholz
5,194,996 A * 3/1993 Shores
5,307,459 A * 4/1994 Peterson et al. ............. 395/200
5,430,243 A * 7/1995 Shioda ........................ 84/645
5,461,415 A * 10/1995 Wolf et al.
5,541,359 A * 7/1996 Lee
5,574,453 A * 11/1996 Nishio et al. ................ 341/143
5,652,400 A * 7/1997 Fujimori et al. ............... 84/600
5,698,806 A * 12/1997 Yamada et al.
5,714,703 A * 2/1998 Wachi et al. .................. 84/603
5,717,870 A * 2/1998 Dobson ...................... 395/250
5,717,932 A * 2/1998 Szczepanek et al. ........ 395/733
5,734,119 A * 3/1998 France et al.
5,750,911 A * 5/1998 Tamura ....................... 84/602
5,752,078 A * 5/1998 Delp et al. .................. 395/827
5,771,301 A * 6/1998 Fuller et al.
5,793,779 A * 8/1998 Yonemitsu et al.
5,844,158 A * 12/1998 Butler et al.
5,872,920 A * 2/1999 Hausman et al. ......... 395/200.8
5,875,341 A * 2/1999 Blank et al. ................. 395/733
5,883,957 A * 3/1999 Moline et al. .................. 380/4

(Continued)

FOREIGN PATENT DOCUMENTS

JP 63-301997 12/1988

(Continued)

OTHER PUBLICATIONS

Partial Translation of office action for Japanese Patent Application 1997-059602, pp. 1-5, mailed Jan. 30, 2001.*

*Primary Examiner*—Andrew Caldwell
(74) *Attorney, Agent, or Firm*—Morrison & Foerster LLP

(57) ABSTRACT

A communications data processing apparatus includes a receiver for receiving data containing time information, a timer for starting counting a time starting from time information derived from the data first received by the receiver and subtracted by a delay time, a memory for temporarily storing the data received by the receiver, a judging unit for judging whether the time information in the data temporarily stored in the memory is later than the time counted by the timer, and a processor for starting the processing of the data temporarily stored in the memory if the judging unit judges that the time information in the data is later.

12 Claims, 8 Drawing Sheets

U.S. PATENT DOCUMENTS 5,905,874 A * 5/1999 Johnson .................. 395/200.8
5,917,835 A * 6/1999 Barrett et al.
5,944,788 A * 8/1999 Krantz et al. ............... 709/213
5,974,015 A * 10/1999 Iizuka et al.
5,998,724 A * 12/1999 Takeuchi et al.
5,999,905 A * 12/1999 Isozaki
5,999,969 A * 12/1999 Holmes et al. .............. 709/213
6,199,076 B1 * 3/2001 Logan et al.
6,263,313 B1 * 7/2001 Milsted et al.
6,285,767 B1 * 9/2001 Klayman
6,314,207 B1 * 11/2001 Persiantsev et al.

FOREIGN PATENT DOCUMENTS

JP 4-30638 7/1992
JP 05-189340 7/1993
JP 6-51762 2/1994
JP 08-054888 2/1996

* cited by examiner

TEMPORARY STORAGE OF COMMUNICATIONS DATA

This application is based on Japanese patent application No. HEI 9-59602 filed on Mar. 13, 1997, the entire contents of which are incorporated herein by reference.

BACKGROUND OF THE INVENTION a) Field of the Invention

The present invention relates to buffering technologies, and more particularly to buffering technologies for buffering data received over a communications network.

b) Description of the Related Art

As a standard specification for communications between electronic musical instruments, a music instrumental digital interface (MIDI) specification is known. Electronic musical instruments equipped with interfaces of the MIDI specification can communicate with each other by transferring MIDI data via a MIDI cable.

For example, an electronic musical instrument transmits MIDI data of a musical performance by a player, and another musical instrument receives it to reproduce it. As one electronic musical instrument is played, another electronic musical instrument can be played in real time. However, in communications of reproducing sounds with high fidelity in real time without any delay time, the amount of communications data per unit time becomes large and a communications delay is likely to occur.

In a communications network interconnecting a plurality of general computers, various types of data are transferred. For example, live musical tone data or other MIDI data can be transmitted from one computer, which once stored the data in its storage device such as a hard disk, via the communications network to another computer which stores the received data in its storage device. Although long distance communications becomes possible via a communications network, a communications delay is likely to occur during long distance communications.

A communications delay is likely to occur during real time communications and long distance communications. This communications delay makes it difficult to smoothly process data at a reception side. For example, the receiver is difficult to smoothly reproduce MIDI data in real time.

SUMMARY OF THE INVENTION

It is an object of the present invention to provide buffering techniques for smoothly processing received data by buffering it.

According to one aspect of the present invention, there is provided a communications data processing apparatus which comprises: reception means for receiving data containing time information; storage means for temporarily storing the data received by the reception means; judging means for judging from the time information contained in the data whether a predetermined time has passed; and processing means for starting the processing of the data temporarily stored in the storage means when the judging means judges that the predetermined time has passed.

The data received by the reception means contains time information. Although the received data is temporarily stored in the storage means, it is not processed immediately but is processed after a lapse of the predetermined time from the time information contained in the data. Since the data is temporarily stored, the data can be processed smoothly even a communications delay occurs during real time communications or long distance communications.

Whether the predetermined time has passed is judged in accordance with the time information of each data packet. Therefore, the process of each data packet can be delayed precisely and the smooth real time process becomes possible.

Since the data is temporarily stored in the storage means, a time sequential flow of data can be known in advance so that the data processing can be performed smoothly.

DETAILED DESCRIPTION OF THE PREFERRED EMBODIMENTS

Figure 1:
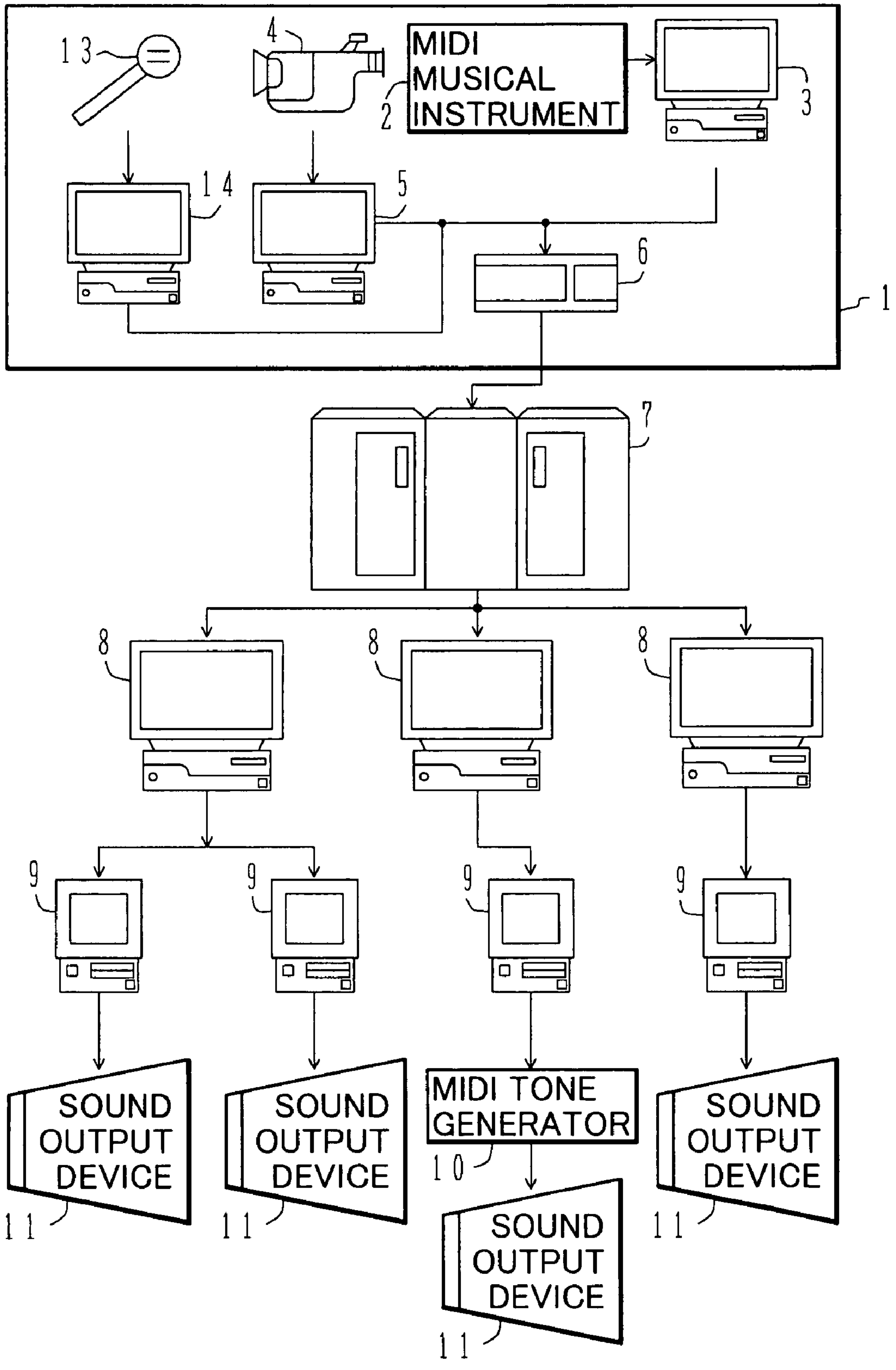
FIG. 1 is a schematic diagram showing a communications network for musical tone data and image data.

FIG. 1 shows a communications network for musical tone data and image data.

A concert hall 1 is installed with a MIDI musical instrument 2, a camera 4, a microphone 13, encoders 3, 5 and 14, and a router 6. A player plays the MIDI musical instrument 2 in the concert hall 1. The MIDI musical instrument 2 generates MIDI data in accordance with the performance by a player, and supplies it to the encoder 3. The encoder 3 transmits each packet of MIDI data of a predetermined format to the Internet via the router 6. The data format will be later described with reference to FIG. 4.

The camera 4 takes an image of a player and supplies it as image data to the encoder 5. The encoder 5 transmits each packet of image data of a predetermined format to the Internet via the router 6. The data format will be later described with reference to FIG. 4.

The microphone 13 samples sounds of live musical instruments such as singers and pianos and electronic musical instruments, and supplies these sample data to the encoder 14 as sound data. The encoder 14 transmits each packet of sound data of a predetermined format to the Internet via the router 6.

The router 6 transmits MIDI data, sound data and image data to the Internet to be described hereinunder. The data is supplied from the router 6 to a server 7 via a public telephone line or a leased telephone line, and to a plurality of world wide web (WWW) servers 8 which are so-called providers.

A user can access the Internet by connecting its home computer 9 to the WWW server 8 to receive MIDI data, sound data and image data. The home computer 9 has a display device for the display of image data and an external or built-in MIDI tone generator for the generation of musical tone signals. The MIDI tone generator generates musical tone signals in accordance with MIDI data, and supplies the tone signals to a sound output device 11. The home computer 9 converts received digital sound data into analog sound data and outputs it to the sound output device 11. The sound output device 11 reproduces sounds in accordance with supplied MIDI data or sound data. Sounds same as those produced in the concert hall 1 can be reproduced from the sound output device 11 in real time.

If an external MIDI tone generator 10 is used, the home computer 9 makes the MIDI generator 10 generate musical tone signals and the sound output device 11 reproduces sounds.

Since the MIDI data and sound data are more important for a user than image data, the MIDI data and sound data are processed with a priority over the image data. Although a user does not feel uneasy about the image data with poor image quality and smaller frame number, sound information and musical tone information of MIDI data are required to have a high quality.

The encoder 3 transmits the initial tone generator setting information before a musical performance starts, and thereafter real musical performance information given by a player is transmitted. Since musical tone information (key-on) is contained in the real musical performance information, the initial tone generator setting information is transmitted before the first musical tone information. After the initial tone generator setting information is transmitted, real time subsequent tone generator setting information is periodically transmitted. Even if the initial tone generator setting information is not received, a user can receive the real time subsequent tone generator setting information transmitted later.

There is no problem if a user accesses a concert hall before a musical performance starts, because the initial tone generator setting information transmitted before the start of the musical performance can be received. If a user accesses the concert hall in the midst of the musical performance, the initial tone generator setting information cannot be received. However, the user can receive the real time subsequent tone setting information transmitted periodically later. Accordingly, proper tone generator setting information can be received at any time when the concert hall is accessed. The tone generator setting information is set to the built-in or external MIDI tone generator of the home computer 9.

The home computer 9 has a memory. Data received at the home computer 9 is buffered in this memory and the data is processed after a predetermined time lapse. Real time communications or long distance communications of MIDI data, sound data or image data is likely to have a data delay. Even if such a data delay occurs, the received data can be processed smoothly because the data is buffered and processed after the predetermined time lapse. In this manner, a musical performance and images can be reproduced smoothly.

Any user can listen to a musical performance in real time by connecting the home computer 9 to the Internet while looking at each scene of the concert hall 1 on the display device at home without going to the concert hall 1. A number of users can enjoy at home the musical performance played in the remote concert hall.

MIDI data is transmitted from the concert hall 1 to each user so that each user can share a situation of the concert hall 1 as if the player is playing the electronic musical instrument at user home.

Instead of live musical tone information, if MIDI data is transmitted over the Internet, the sound quality is not degraded by noises. However, since long distance communications via a number of communications sites is performed over the Internet, the following method of dealing with communications errors becomes necessary when data is transmitted from the encoders 3, 5 and 14 and when the data is received at the home computer 9. For example, communications errors include data change, data loss, data duplication, data sequence change and the like.

Figure 2:
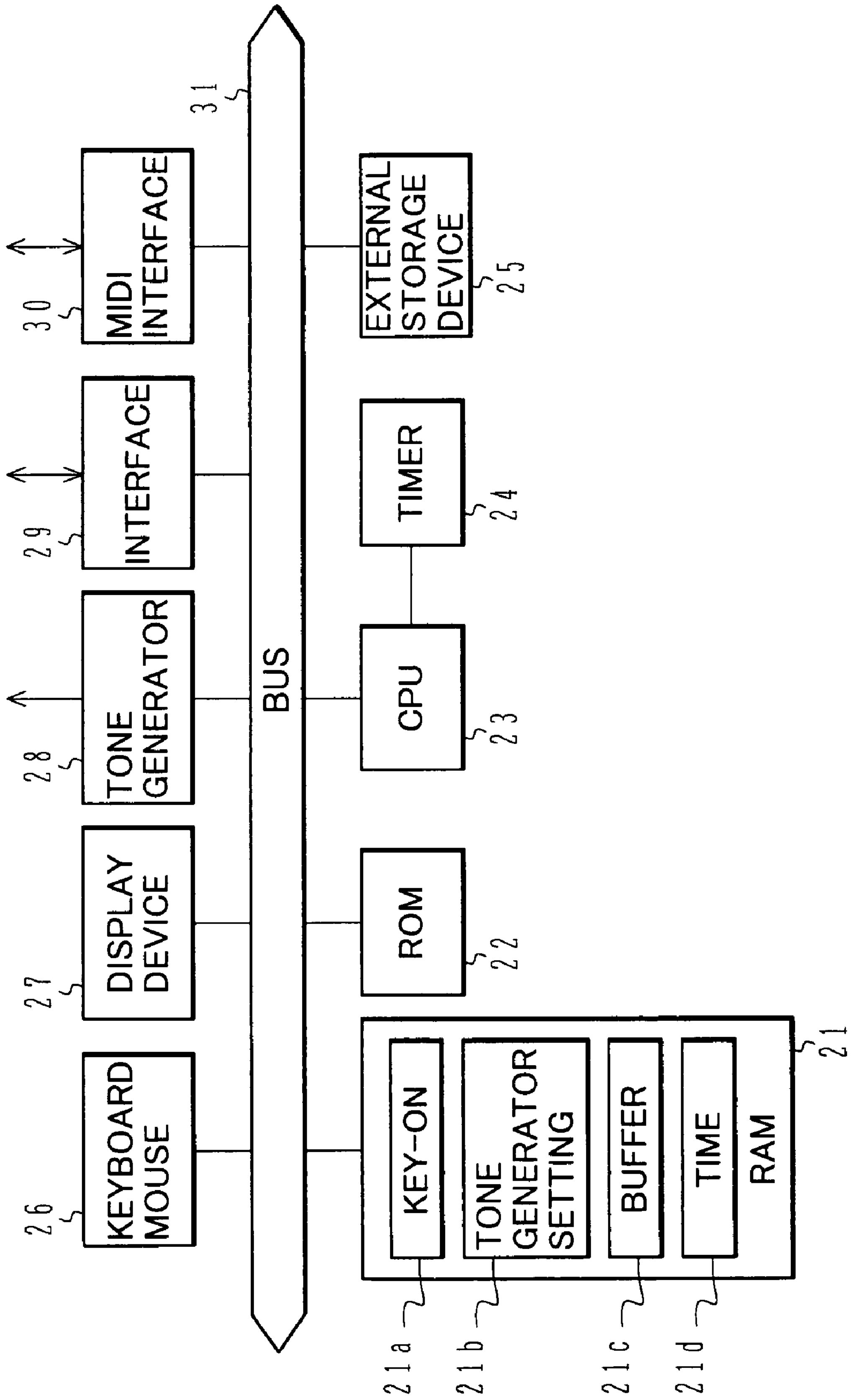
FIG. 2 is a block diagram showing the hardware structure of an encoder and a home computer.

FIG. 2 shows the hardware structure of the encoders 3, 5 and 14 and the home computer 9 which may be a general computer.

Connected to a bus 31 are an input device 26 such as a keyboard and a mouse, a display device 27, a MIDI tone generator 28, a communications interface 29 for connection to the Internet, a MIDI interface 30, a RAM 21, a ROM 22, a CPU 23, and an external storage device 25.

Various instructions can be entered from the input device 26. In the home computer 9, the display device 27 displays each scene of a concert hall, and the MIDI tone generator 28 generates musical tone signals in accordance with received MIDI data and transmits them to an external circuitry. The MIDI tone generator 28 performs various settings in accordance with the received initial or subsequent tone generator setting information.

The communications interface 29 is used for transferring MIDI data, sound data and image data to and from the Internet. The MIDI interface 30 is used for transferring MIDI data to and from an external circuitry.

The external storage device 25 may be a hard disk drive, a floppy disk drive, a CD-ROM drive, a magneto-optical disk drive or the like and may store therein MIDI data, sound data, image data, computer programs and the like.

ROM 22 may store therein computer programs, various parameters and the like. RAM 21 has a key-on buffer **21*a* and a tone generator setting buffer 21*b*. The key-on buffer 21*a* stores a key-on event contained in MIDI data, and the tone generator setting buffer 21*b*** stores tone generator setting data (including initial tone generator setting information) contained in MIDI data.

The encoder 3 (FIG. 1) first transmits the initial tone generator setting information, and thereafter periodically transmits real time tone generator setting information stored in the tone generator setting buffer **21*b***.

The home computer 9 (FIG. 1) buffers received data in the buffer **21*c* of RAM 21, and starts processing the buffered data after the predetermined time lapse. This predetermined lapse time is stored in the time register 21*d* of RAM 21**.

RAM 21 has also working areas such as buffers and registers to copy and store data in ROM 22 and the external storage device 25. In accordance with computer programs stored in ROM 22 or RAM 21, CPU 23 performs various calculations and signal processing. CPU 23 can fetch timing information from a timer 24 to perform a timer interrupt.

The external storage device 25 may be a hard disk drive (HDD). HDD 25 may store therein various data such as computer program data and MIDI data. If a necessary computer program is stored not in ROM 22 but in a hard disk loaded in HDD 25, this program is read into RAM 21 so that CPU 23 can run this program in the similar manner as if the program is stored in ROM 22. In this case, addition, version-up and the like of a computer program become easy. The external storage device 25 includes a CD-ROM (compact-disk-read-only-memory) drive which can read various data such as computer programs stored in a CD-ROM. The read data such as a computer program is stored in a hard disk loaded in HDD. Installation, version-up and the like of a computer program become easy.

The communications interface 29 is connected to a communications network such as a local area network (LAN) and a telephone line, and via the communications network to a server computer (e.g., server 7 shown in FIG. 1). If computer programs and data are not stored in a hard disk loaded in HDD, these programs and data can be downloaded from the server computer.

In this case, a client such as the encoder 3, 5, 14 and home computer 9 transmits a command for downloading a computer program or data to the server computer via the communications interface 29 and communications network. Upon reception of this command, the server computer supplies the requested computer program or data to the client via the communications network which client receives it via the communications interface 29 and stores it in a hard disk loaded in HDD. In addition to the computer program, the initial or subsequent tone generator setting information may be received during this downloading.

This embodiment may be reduced into practice by a commercially available personal computer installed with computer programs and various data realizing the functions of the embodiment. The computer programs and various data may be supplied to a user in the form of a storage medium such as a CD-ROM and a floppy disk which the personal computer can read. If the personal computer is connected to the communications network such as the Internet, a LAN and a telephone line, the computer programs and various data may be supplied to the personal computer via the communications network.

Figure 3:
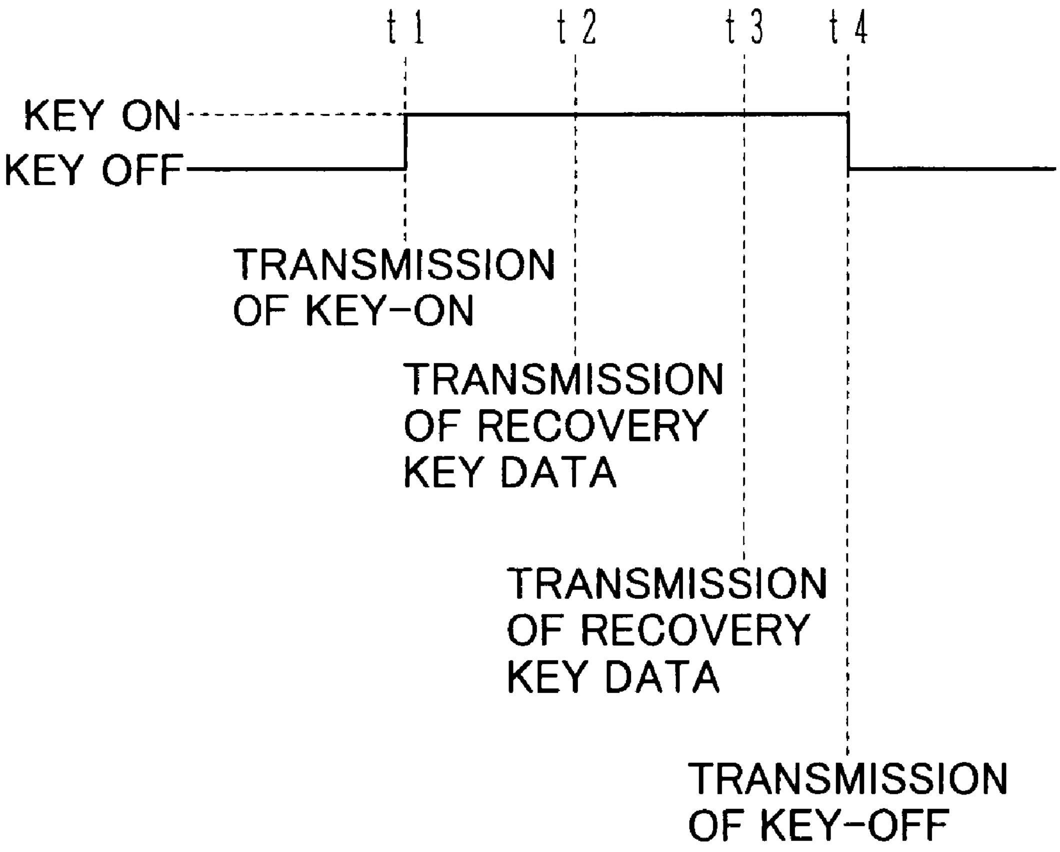
FIG. 3 is a timing chart illustrating a method of dealing with MIDI data communications errors.

FIG. 3 is a diagram illustrating a method of dealing with communications errors of MIDI data, indicating a key-on event at a high level and a key-off event at a low level by way of example.

In this example, a key-on event is transmitted at a timing t1 and a key-off event is transmitted at a timing t4. The key-on event transmitted at the timing t1 may be lost in some case by communications errors. In such a case, the home computer 9 on the reception side cannot receive the key-on event and receives only the key-off event so that a correct musical performance cannot be reproduced. The reception of only the key-off event without the key-on event will not occur according to the musical performance rule.

In order to improve such a case, during the period after the transmission of the key-on event at the timing t1 and before the transmission of the key-off event at the timing t4, recovery key data is transmitted periodically at a predetermined time interval, in this example, at timings t2 and t3.

The recovery key-on data is confirmation data which notifies the reception side of a continuation of a key-on state. Even if the key-on event cannot be received at the timing t1, the key-on event is enabled when the recovery key data is received at the timing t2 although there is some delay from the timing t1. Similarly, even if the key-on event cannot be received both at the timings t1 and t2, it is enabled at the timing t3 when the recovery data is received.

Generally, a musical tone signal attenuates with time (a sound volume lowers). It is therefore preferable to transmit the recovery key data with the information of a lowered velocity (sound volume) corresponding to the time lapse. The velocity information is always contained in the key-on event and transmitted together with the key-on event. In this example, key-on events (recovery key data) with gradually lowered velocities in the order of timings t1, t2 and t3 are transmitted.

A communications error of a key-on event can therefore be remedied by the recovery key data. A recovery method to be used when the key-off event at the timing t4 is lost will be described next.

It is possible to transmit key-off recovery data after the key-off event, similar to the recovery method for the key-on event. However, the time duration of a key-off is much longer than that of a key-on of each key of the keyboard. If the recovery key data is transmitted after the key-off event until the next key-on event occurs, the amount of this recovery key data becomes bulky.

The recovery key data for the key-on event is transmitted during the period after the key-on timing t1 and before the key-off timing t4, and is not transmitted after the key-off timing t4. That the recovery key data is not transmitted means that a key-off event has already occurred.

Therefore, if the home computer 9 cannot receive the key-off event at the timing t4 but can detect that the recovery key data is not periodically transmitted, it is judged that the key state is presently a key-off.

If the recovery key data cannot be received periodically during the key-on, the home computer 9 can judge that there was a communications error, and enables the key-off so that a false continuation of sound reproduction can be avoided. This judgement is made by referring to the key-on buffer 21*a* shown in FIG. 2, and the details thereof will be later described with reference to a flow chart.

Similar to the key-on and key-off recovery, recovery tone generator setting data for recovering lost tone generator setting data can be transmitted by referring to the tone generator setting buffer 21*b* shown in FIG. 2.

Figure 4:
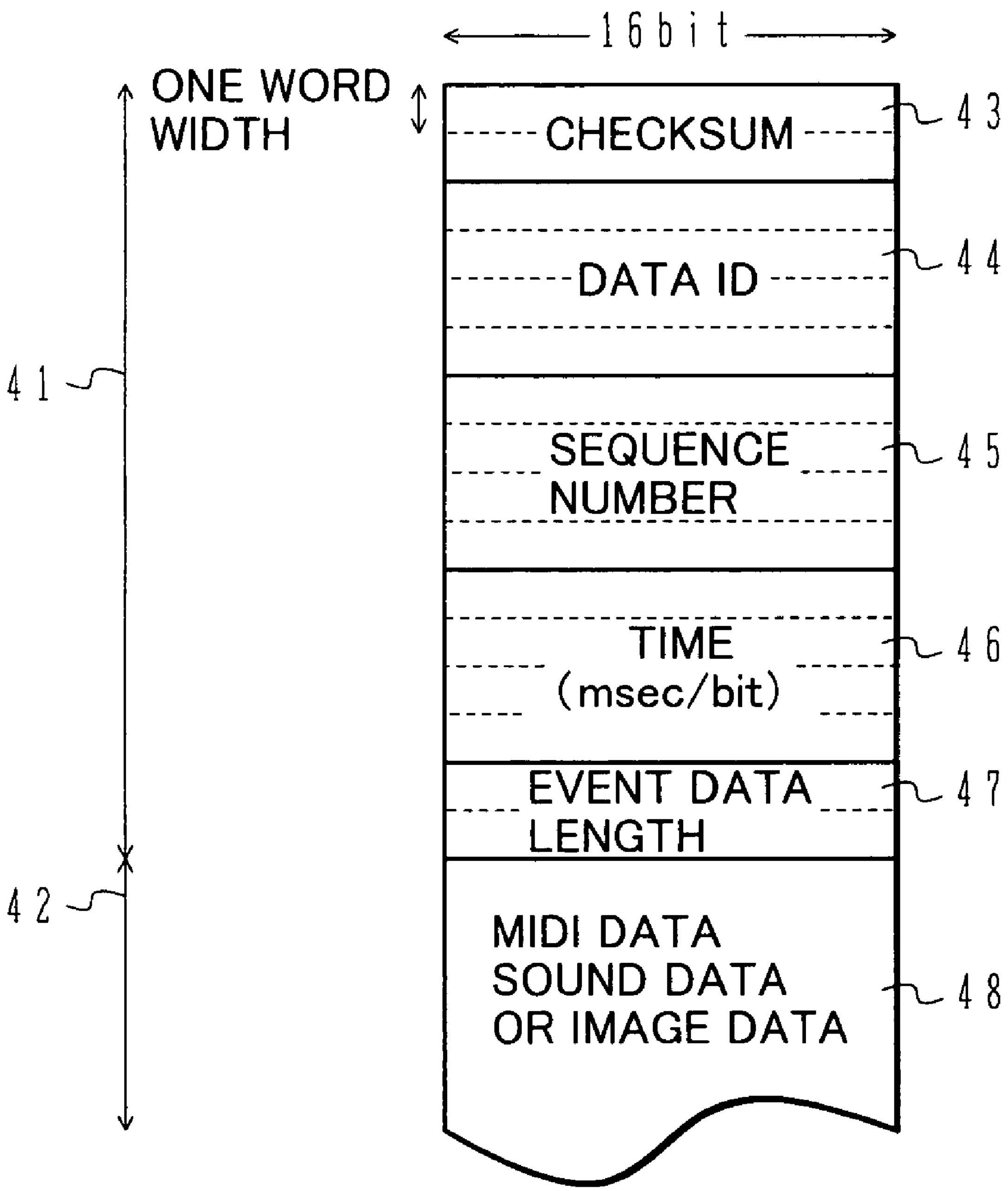
FIG. 4 shows the format of a communications packet.

FIG. 4 shows the format of a communications packet. A communications packet is transmitted from the encoder 3, 5, 14 shown in FIG. 1 or received by the home computer 9 shown in FIG. 1.

The packet is constituted of a header field 41 and a data field 42. The header field 41 contains checksums 43 of two words (one word is 16 bits), a data ID 44 of four words, a sequence number 45 of four words, time data 46 of four words, and an event data length 47 of two words.

The checksums 43 are representative values of all data in the header field 41 excepting the checksums and in the data field 42. The transmitting side calculates these representative values and transmits a packet added with the checksums 43. The receiving side recalculates the representative values of data in the packet and checks whether the recalculated representative values are coincident with the transmitted checksums 43. If coincident, it is judged that there is no communications error.

The data ID 44 is a number identifying the type of the data field 42. The numbers "0", "1", "2" and "3" indicate MIDI data, the number "4" indicates image data, and the number "5" indicates sound data. The number "0" indicates real event data (ordinary MIDI data), the number "1" indicates the recovery key data (FIG. 3), the number "2" indicates the recovery tone generator setting data (e.g., control data frequently set in the midst of a performance), the number "3" indicates the real time subsequent tone generator setting information periodically transmitted in the midst of a performance (e.g., tempo information often set only at the start of playing a program). Since the real time subsequent tone generator setting information is periodically transmitted, even if the initial tone generator setting information cannot be received, a proper tone generator setting information can be received.

The sequence number 45 is a number assigned to each packet in the sequential order. By checking the sequence number 45, the receiving side can recover or reorder the packets even if the order of packets is changed by communications errors.

The time data 46 indicates a reproduction time representing 1 ms by one bit. Since this data 46 has four words, the time information of 100 hours or longer can be given. Using this time information 46 allows a simultaneous session of a plurality of concert halls. A simultaneous musical performance can be listened at each home at an arbitrary site by assigning the time information 46 as a musical performance time at each concert hall and providing synchronization between a plurality of concert halls. Although the time information 46 is preferably an absolute time, it may be a relative time commonly used by all concert halls.

The event data length 47 indicates the length of data in the data field 42.

The data field 42 contains real data 48 which is MIDI data, sound data or image data.

A high communications speed is preferable, for example, 64 K bits/s (ISDN). The data length of one packet is not limited. It is preferably about 1 K bytes or 512 bytes from the viewpoint of communications efficiency.

Figure 5:
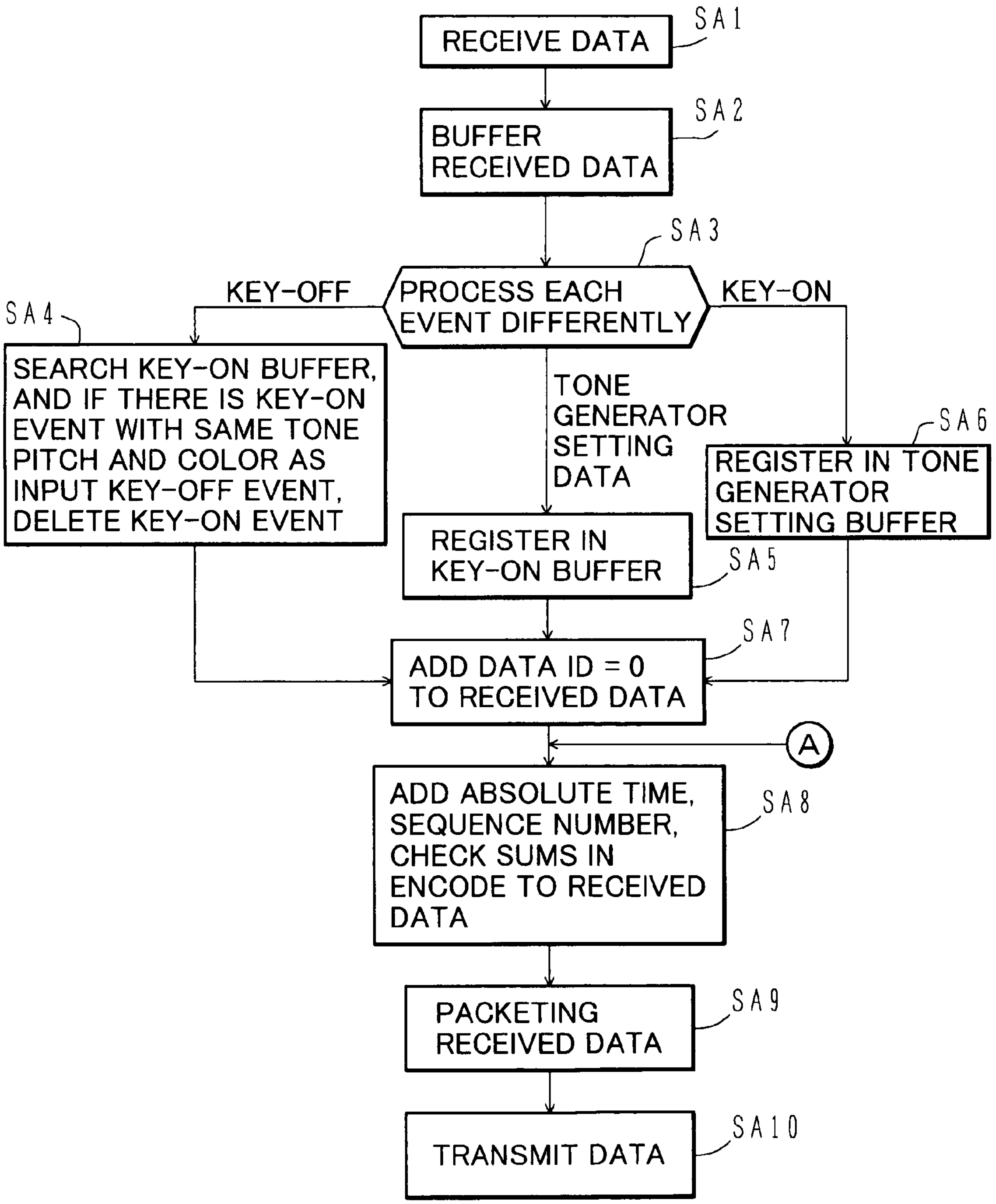
FIG. 5 is a flow chart illustrating the operation of a transmission process to be performed by an encoder.

FIG. 5 is a flow chart illustrating the operation of a transmission process to be executed by the encoder 3 (FIG. 1).

At Step SA1, MIDI data is received from the MIDI musical instrument 2. At Step SA2, the received data is buffered in RAM 21.

At Step SA3, the type of an event of the received data is checked. The type of an event includes a key-on event, a key-off event and a tone generator setting data event. If the type is key-on, the flow advances to Step SA6 whereat the key-on event is registered in the key-on buffer 21*a* (FIG. 2) to thereafter follow Step SA7.

If the type is key-off, the flow advances to Step SA4 whereat the key-on buffer 21*a* is searched. If there is the same key code (sound pitch) as that in the key-off event, the corresponding key-on event is deleted from the key-on buffer 21*a* to thereafter follow Step SA7.

If the type is tone generator setting data, the flow advances to Step SA5 whereat the tone generator setting data is registered in the tone generator setting buffer 21*b* (FIG. 2) to thereafter follow Step SA7. The tone generator setting data includes program change data, control data, exclusive message data, and the like. The tone generator setting data used at this Step is information about the performance by a player, and is not the initial tone generator setting information.

At Step SA7, the MIDI data received from the MIDI musical instrument is added with, as shown in FIG. 4, a data ID (No. "0") indicating real event data (inclusive of tone generator setting information).

At Step SA8, the received data is added with, as shown in FIG. 4, checksums 43, a sequence number 45, a time data 46 of the timer 24 and an event length 47, and configured at Step SA9 into a packet which is transmitted at Step SA10. The time data 46 is a reference time generated through count-up by the encoder 3. Although this time data is preferably an absolute time, a relative time may also be used. After Step SA10, the transmission process is terminated.

A plurality of events of the same type generated at near timings may be configured into one packet. Specifically, instead of packeting data each time an event occurs, data may be collected during a time duration which human auditory sense cannot recognize as a delay, and the collected data is converted into one packet which is then transmitted.

By using the same process, the encoder 5, 14 transmits image data and sound data. In this case, the data ID 44 is No. 3 and No. 4.

Figure 6:
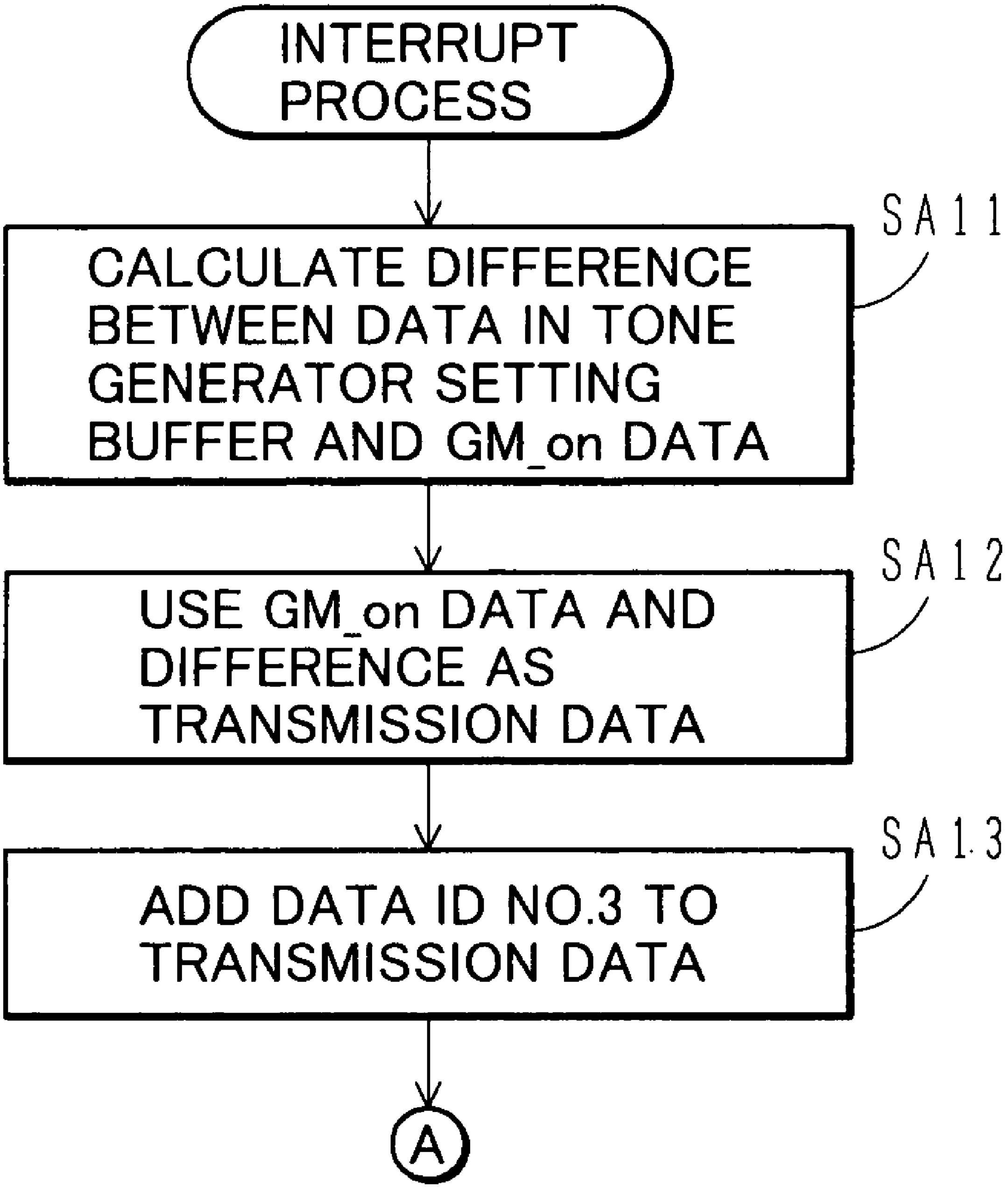
FIG. 6 is a flow chart illustrating the operation of an interrupt process to be performed by the encoder.

FIG. 6 is a flow chart illustrating the interrupt process to be executed by the encoder 3. This interrupt process is performed at a predetermined interval in response to the timing supplied from the timer 24. This interval may be set arbitrarily.

At Step SA11 a difference between the data in the tone generator setting buffer 21*b* (FIG. 2) and GM_on data is calculated. GM_on data is a reference tone generator setting code decided by the GM specification of MIDI data. When GM_on data is received, the tone generator is set in a predetermined manner. GM_on data is stored in RAM 21, ROM 22 or external storage unit 25 shown in FIG. 2. At this Step, a difference between the tone generator setting information represented by GM_on data and the tone generator setting information stored in the tone generator setting buffer 21*b* is obtained.

At Step SA12, the difference and GM_on data (single code) are used as transmission data. This transmission data is equivalent to the real time subsequent tone generator setting information stored in the tone generator setting buffer 21*b*. Instead of the transmission data, the tone generator setting information stored in the tone generator setting buffer 21*b* may be used as the transmission data.

If the amount of the tone generator setting information is large, it is preferable to transmit the difference and GM_on data as the transmission data, because a signal representative of GM_on data is a single code and the amount of data to be transmitted becomes small.

Instead of GM_on data, another reference tone generator setting code (e.g., XG_on data) may be used. The amount of data to be transmitted may be reduced by selecting a reference tone generator setting code nearest to the real time subsequent tone generator setting information from a plurality of reference tone generator setting codes and by using the selected reference tone setting code and a difference as the transmission data.

This transmission data corresponds to the real time subsequent tone generator information. The real time subsequent tone generator information may include all tone generator setting information settable to a tone generator or may be only the tone generator setting information contained in the initial tone generator setting information.

At Step SA13, the data ID 44 (FIG. 4) with No. 3 is added to the transmission data. No. 3 of the data ID indicates that the transmission data is the real time subsequent tone generator setting information. Thereafter, the flow returns to Step SA8 shown in FIG. 5.

At Step SA8 the transmission data is added with the check sums 43, sequence number 45, time data 46 and event data length 47 shown in FIG. 4, packeted at Step SA9 and transmitted at Step SA10. The interrupt process is thereafter terminated.

The encoder 3 transmits first the initial tone generator setting information, and thereafter periodically transmits the real time subsequent tone generator information. Therefore, even if the initial tone generator setting information cannot be received, a user can receive a proper real time subsequent tone generator information.

The real time subsequent tone generator information is not always required to be transmitted periodically, but it may be transmitted at desired timings. It may be transmitted at a timing designated by the home computer, not at a timing determined by the transmission side. For example, the encoder 3 may transmit the real time subsequent tone generator information at the timing when a user accesses the concert hall.

The real time subsequent tone generator information may be stored in the WWW server 8 at a proxity site or the like. In this case, the real time subsequent tone generator information is not transmitted directly from the encoder 3 to the home computer 9, but it is downloaded from the WWW server 8 or the like to the home computer 9.

The real time subsequent tone generator information is not limited to be used only by the Internet communications, but it may be used by the MIDI communications between electronic musical instruments.

Figure 7:
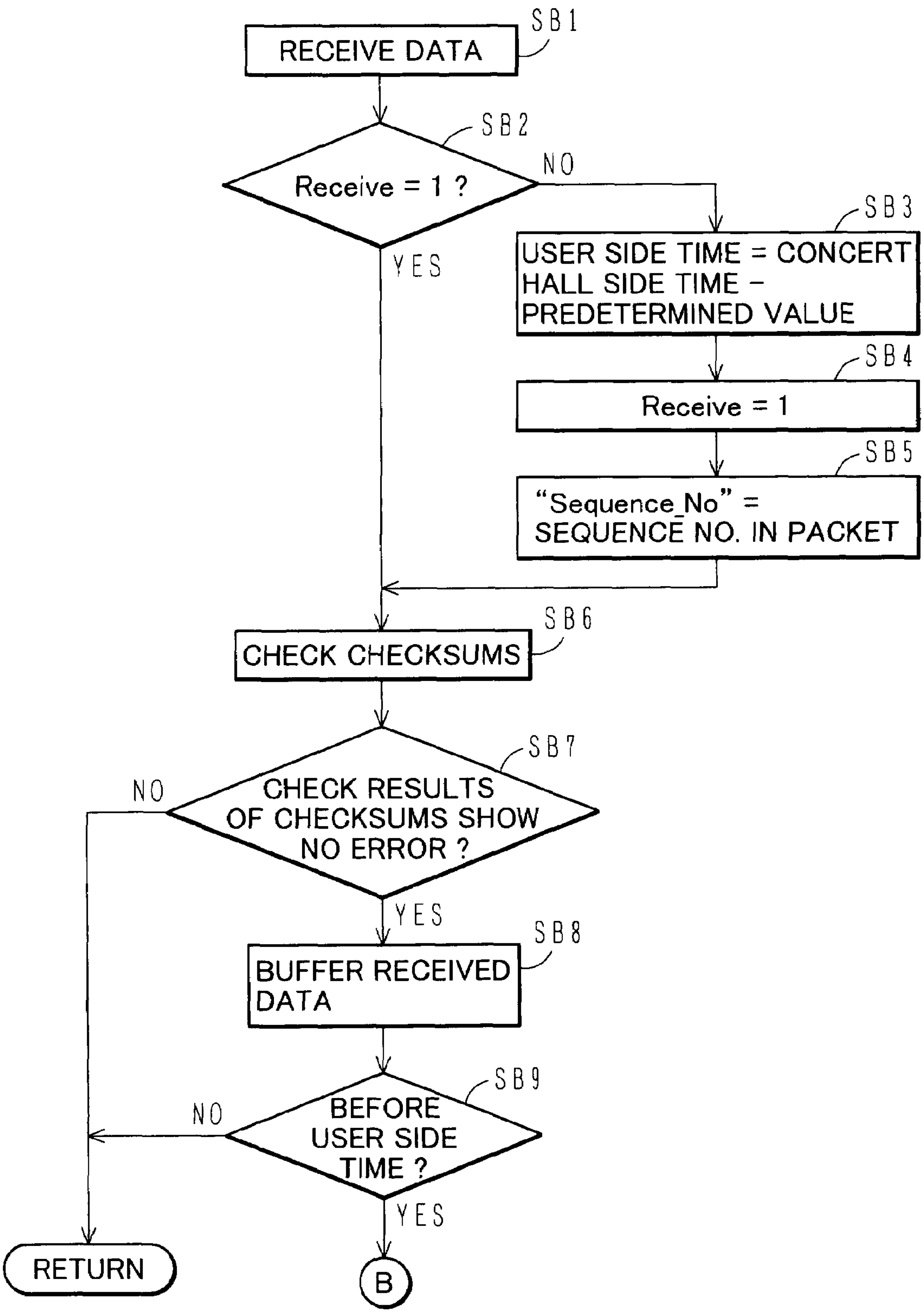
FIG. 7 is a flow chart illustrating the operation of a reception process to be performed by a home computer.
Figure 8:
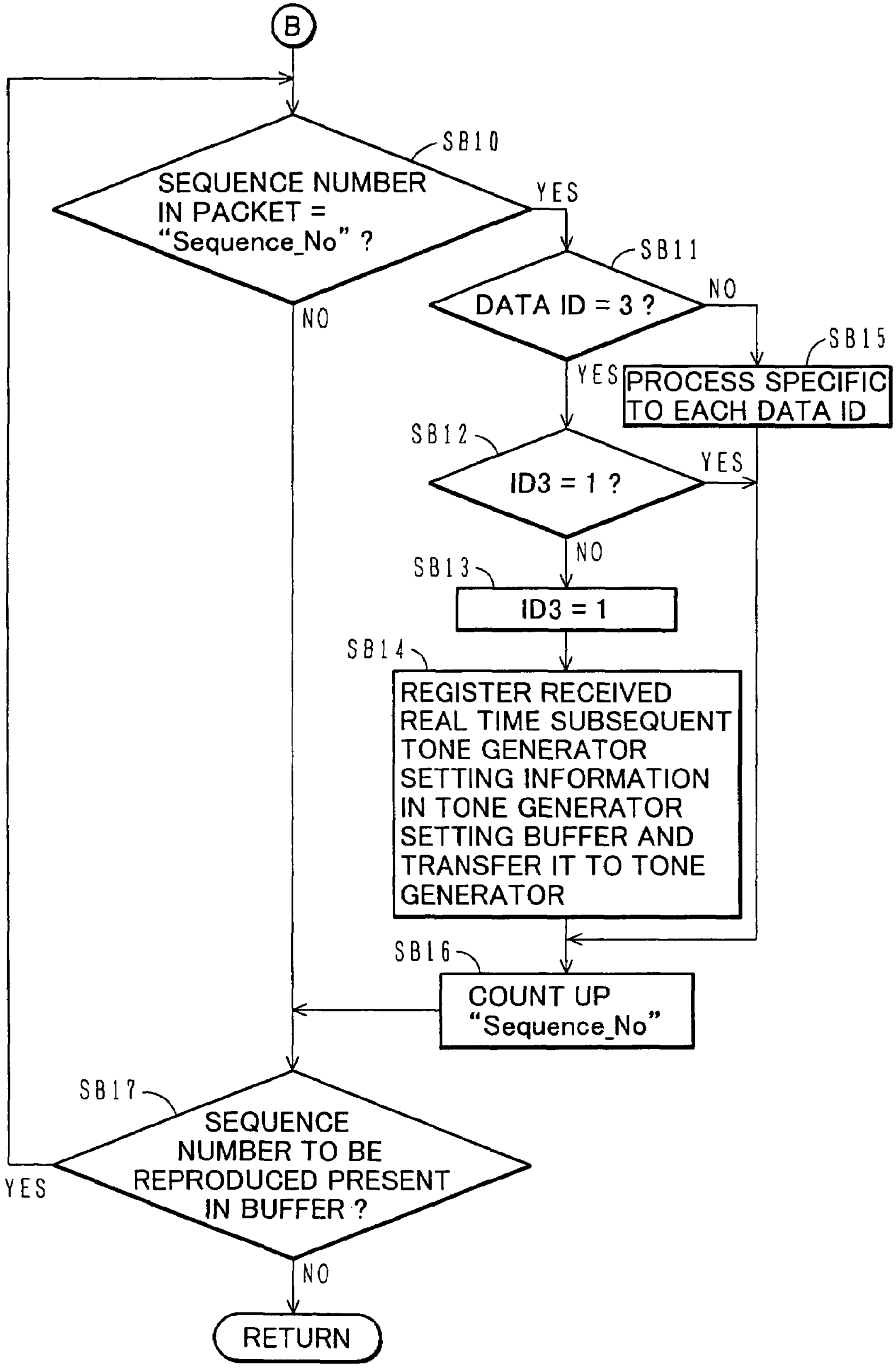
FIG. 8 is a flow chart illustrating the operation of the reception process following the reception process shown in FIG. 7.

FIGS. 7 and 8 are flow charts illustrating the reception process to be executed by the home computer 9 (FIG. 1).

At Step SB1, data on the Internet is received.

At Step SB2 it is checked whether a flag "Receive" is "1". This flag is used for judging whether or not the received packet is the first received packet, and is initially set to "0". If the packet is the first received packet, the flag "Receive" is "0" and the flow advances to Step SB3, whereas if the packet is the second or following packet, the flag "Receive" is "1" and the flow advances to Step SB6 by skipping Steps SB3 to SB5.

At Step SB3, time data on the concert hall side subtracted by a predetermined value is set as time data on the user side. The time data on the concert hall side is counted up at the encoder 3 (FIG. 1), and the time data on the user side is counted up at the home computer 9 (FIG. 1). For example, the time data 46 (FIG. 4) contained in the first received packet is set as the time data on the concert hall side, and this time data subtracted by the predetermined value is set as the time data on the user side. The home computer 9 thereafter starts counting up the user side time data.

This predetermined value corresponds to a time during which the data received by the home computer 9 is buffered and delayed. This predetermined value is stored in the time register 21*d* shown in FIG. 2. By delaying the whole process by the predetermined time, the received data can be processed smoothly. The details thereof will be later described.

A user can change this predetermined value as desired. The encoder 3 on the concert hall side may transmit this predetermined value to the home computer 9. The predetermined value may be determined in accordance with the capacities of the memory and buffer of a home computer. It is necessary to set a large predetermined value if the memory capacity or the like is large and set a small predetermined value if the memory capacity or the like is small.

At Step SB5, the sequence number 45 (FIG. 4) contained in the received packet is set to a register "Sequence_No". This register is used for storing the sequence number of a packet presently processed. Thereafter, the flow advances to Step SB6.

At Step SB6, the checksums 43 (FIG. 4) in the received packet are checked.

At Step SB7 it is checked whether the check result of the checksums is normal or error. If error, it means that the data in the packet has an error or errors so that the flow is directed to the NO arrow to terminate the process without performing any operation. Not performing any operation and discarding the data having less reliability is effective because false sound reproduction and setting are not performed.

If the checksums are normal, the data in the packet is reliable so that the flow is directed to the YES arrow and to Step SB8 whereat the received data is buffered in the buffer 21*c* of RAM 21.

At Step SB9 it is checked whether the time data contained in the packet shows a time before the user side time data. The first received packet does not satisfy this conditions because the user side time data was set to the concert hall side time data subtracted by the predetermined value at Step SB3. Therefore, the flow is directed to the NO arrow to terminate the process without processing the buffered data. After the lapse of the predetermined time, the flow is directed to the YES arrow and to Step SB10 shown in FIG. 8.

At Step SB10 it is checked whether the sequence number 45 in the packet is the same as the number stored in the register "Sequence_No". If coincident, the flow is directed to the YES arrow and to Step SB11.

At Step SB11 it is checked whether the data ID number in the packet is "3". If "3", it means that the packet corresponds to the real time subsequent tone generator information and the flow advances to Step SB12. A method of discriminating the real time subsequent tone generator information is not limited only to the above case using the data ID. For example, an identifier of the real time subsequent tone generator information may be stored in another field of a packet to discriminate it.

At Step SB12 it is checked whether a flag ID3 is "1". This flag indicates whether the real time subsequent tone generator information has already been received, and is initially set to "0" which indicates that the real time subsequent tone generator information is not still received. Since the flag ID3 is initially "0", the flow advances to Step SB13.

At Step SB13, the flag ID3 is set with "1".

At Step SB14, the received real time subsequent tone generator information is registered in the tone generator setting buffer and transferred to the tone generator to set it. Thereafter, the flow advances to Step SB16.

After the first real time subsequent tone generator information is received, the second and following real time subsequent tone generator information periodically transmitted is received. In this case, it is judged at Step SB12 that the flag ID3 is "1" so that the flow is directed to the YES arrow and to Step SB16 without setting the tone generator. Namely, it is sufficient if the real time subsequent tone generator information is set once, and the second and following real time subsequent tone generator information is not set.

The data ID of the initial tone generator setting information may be set with the number "3" same as the real time subsequent tone generator information. In this case, if the tone generator is set with the real time subsequent tone generator information, the real time subsequent tone generator information periodically transmitted later is not necessary to be set.

At Step SB16 the value in the register "Sequence_No" is counted up to prepare for the next packet. Thereafter, the flow advances to Step SB17.

At Step SB17 it is checked whether data having a sequence number to be reproduced is present in the buffer. If the buffer stores the data of the next sequence number, the flow returns to Step SB10 to repeat the above processes. If there is no data in the buffer to be reproduced, the flow is directed to the NO arrow to terminate the process.

In normal communications, the sequence number sequentially increases each time a packet is received. However, the order of sequence numbers of received data may be changed by communications errors. Namely, the data of a succeeding packet may reach before the data of a preceding packet. In such a case, the sequence number in the packet is different from that in the register "Sequence_No" at Step SB10 so that the flow advances to Step SB17.

At Step SB17, if data whose process was skipped is already stored in the buffer, the flow returns to Step SB10 to execute the above processes which are repeated until data to be reproduced is not present in the buffer. In the above manner, even if the order of data sequence is changed by communications errors, received data can be processed properly.

If it is judged at Step SB11 that the data ID number is "0", "1", "2", "4" or "5", the flow advances to Step SB15 whereat the process specific to each data ID number is performed in the following manner to thereafter return to Step SB16.

If the data ID number is "0", the received data is real event data. In this case, key-on data, key-off data or tone generator setting information is transferred to the tone generator.

If the data ID number is "1", the received data is recovery key data. In this case, the recovery key data is compared with the key data in the key-on buffer and a difference is registered in the key-on buffer and transferred to the tone generator.

If the data ID number is "2", the received data is recovery tone generator setting information. In this case, the recovery tone generator setting information is compared with the real time subsequent tone generator setting information in the tone generator setting buffer and a difference is registered in the tone generator setting buffer and transferred to the tone generator.

If the data ID number is "4", the received data is image data. In this case, the image data is processed to display it.

If the data ID number is "5", the received data is sound data. In this case, the sound data is converted into analog signals, amplified, and supplied to a speaker which reproduces sounds of musical tone data.

If data of a predetermined amount or more is stored in the buffer, it is judged that the data having the sequence number to be next processed was lost, the process for this data is skipped, and the process for the data having the next sequence number is performed.

In the above description of Step SB3 (FIG. 7), the concert hall side time data subtracted by the predetermined value is set as the user side time data to delay the process by the predetermined time. Instead, the user side time data may be set equal to the concert hall side time data to delay the process by a predetermined time by adding this time to the time data in each of all received packets.

Specifically, at Step SB3 the time data in a packet is set as the user side time data, a predetermined time is added to the time data in each of all received packets, and the received data is buffered in the buffer.

Without changing the user side time data and concert hall side time data, a predetermined delay time may be set at the home computer side. In this case, after the first packet is received, data processing is stopped during the delay time and starts after the lapse of this delay time.

Further, the sequence numbers may be used for delaying the process by a predetermined time. Namely, some sequence numbers are not used, and the following sequence numbers are assigned to packets at the home computer. In this manner, the home computer stops the process during the time period required for processing the sequence numbers not used, to thereby delay the process by a predetermined time.

Since data is buffered in the buffer at Step SB8, data received during a certain time period is stored in the buffer. By checking this data, a time sequential flow of data can be known and unnatural data can be located. For example, if the volume value changes abruptly over a limit value, it can be judged that the data is unnatural. Such unnatural data is supposed to be generated by communications errors or the like. If such unnatural data is removed from the buffer, it is possible to stop reproducing unnatural musical tones and the load of CPU can be reduced. Smooth processing can therefore be realized. For example, a volume control process by using unnatural volume data can be dispensed with.

Techniques of delaying a process by a predetermined time can be applied not only to the Internet communications but also to other communications such as MIDI communications between electronic musical instruments.

In the embodiment described above, musical performance information (MIDI data), sound data (audio data) and musical performance image (image data) in a concert hall can be supplied to a number of users by using the Internet. A user can obtain MIDI data, sound data and image data in real time at home without going to the remote concert hall.

If the encoder at each of a plurality of concert halls adds the same time data to MIDI data and the like, a simultaneous session by a plurality of concert halls becomes possible.

The encoder in a concert hall transmits first the initial tone generator setting information, and thereafter periodically transmits the real time subsequent tone generator information. Accordingly, a home computer of each user can receive a proper real time subsequent tone generator information even if the initial tone generator setting information cannot be received.

Real time communications or long distance communications is likely to have a data delay. Even if such a data delay occurs, the data received by the home computer 9 can be processed smoothly because the data is buffered and processed after the predetermined time lapse. Buffering can absorb a delay in communications.

A number of users can access the encoder in a concert hall. A communications distance is different at each user access point. Long distance communications is applied to some users, whereas short distance communications is applied to other users. In this case, a process delay time can be set independently at each home computer on the user side. Therefore, smooth data processing is possible for users of both long and short distance communications.

The embodiment is not limited only to the Internet, but other communication systems may also be used, for example, digital serial communications of IEEE 1394 specifications, communication satellites and the like.

The present invention has been described in connection with the preferred embodiments. The invention is not limited only to the above embodiments. It is apparent that various modifications, improvements, combinations, and the like can be made by those skilled in the art.

What is claimed is:

1. A music data processing apparatus connecting to an external device via a public communications line, comprising:

a receiver that receives a series of music data each containing first time information from said external device via the public communications line;

a judging device that judges whether each of said received music data is received first from the external device or not;

a controlling device that rectifies said first time information by a predetermined value and sets the rectified first time information as second time information for the music data processing apparatus when said judging device judges said received music data is the first received data and does not set the first time information as the second time information when said judging device judges said received music data is not the first received data;

a memory that temporarily stores said received music data;

a processor that counts up the second time information periodically and processes the stored music data in accordance with said counted up second time information and the first time information contained in the music data to be processed.

2. A music data processing apparatus according to claim 1, wherein said first time information contained in the music data received from the external device is absolute time added at the external device.

3. A music data processing apparatus according to claim 1, wherein said receiver further receives a value for rectifying the first time information from the external device, and said controlling device rectifies said first time information with said received value.

4. A music data processing apparatus according to claim 1, further comprising a determiner that determines the predetermined value for rectifying the first time information in accordance with capacity of said memory for storing the received music data, and wherein the setting device rectifies said time information with said determined value.

5. A music data processing method performed by a music data processing apparatus connecting to an external device via a public communications line, said method comprising the steps of:

(a) receiving a series of music data each containing first time information from said external device via the public communications line;

(b) judging whether each of said received music data is received first from an external device or not;

(c) rectifying said first time information by a predetermined value and setting the rectified first time information as second time information for the music data processing apparatus when said judging step judges said received music data is the first received data and not setting the first time information as the second time information when said judging step judges said received data is not the first received data;

(d) temporarily storing said received music data; and (e) counting up the second time information periodically and processing the stored music data in accordance with said counted up second time information and the first time information contained in the music data to be processed.

6. A storage medium storing a program, which a computer executes to realize a music data process for a music data processing apparatus connecting to an external device via a public communications line, comprising the instructions for:

(a) receiving a series of music data each containing first time information from said external device via the public communications line;

(b) judging whether each of said received music data is received first from an external device or not;

(c) rectifying said first time information by a predetermined value and setting the rectified first time information as second time information for the music data processing apparatus when said judging step judges said received music data is the first received data and not setting the first time information as the second time information when said judging step judges said received music data is not the first received data;

(d) temporarily storing said received music data; and (e) counting up the second time information periodically and processing the stored music data in accordance with said counted up second time information and the first time information contained in the data to be processed.

7. A music data processing apparatus connecting to an external device via a public communications line and processing music data received from the external device via the public communications line, comprising:

a receiver that receives music data containing first time information representing first time from said external device via the public communications line;

a setting device that sets second time as second time information for the music data processing apparatus by subtracting a predetermined value from said first time;

a memory that temporarily stores the music data received by said receiver;

a processor that periodically counts up said second time information and starts processing the music data temporarily stored in said memory when said second time information reaches said first time information;

a checking device that checks a time sequential flow of music data temporarily stored in said memory; and a remover that removes unnatural data from the flow of music data stored in said memory to prevent production of an unnatural musical tone, wherein said music data temporarily stored in said memory contains data related to volume of a musical tone, and said unnatural data is data which rapidly changes volume of a musical tone.

8. A music data processing apparatus according to claim 7, wherein:

said receiver further receives recovery data for recovering music data not received due to a communications error, the recovery data containing third time information;

said memory further stores said received recovery data temporarily; and said processor further processes said stored recovery data when said second time information reaches said third time information.

9. A music data processing method performed by a music data processing apparatus connecting to an external device via a public communications line and processing music data received from the external device via the public communications line, said method comprising the steps of:

(a) receiving music data containing first time information representing first time from said external device via the public communications line;

(b) setting second time as second time information for the music data processing apparatus by subtracting a predetermined value from said first time;

(c) temporarily storing the music data received by said receiving step;

(d) periodically counting up said second time information;

(e) starting to process the music data temporarily stored in said storing step when said second time information reaches said first time information;

(f) checking a time sequential flow of data temporarily stored in said memory; and (g) removing unnatural data from the flow of music data stored in said memory to prevent production of an unnatural musical tone, wherein said music data temporarily stored in said memory contains data related to volume of a musical tone, and said unnatural data is data which rapidly changes volume of a musical tone.

10. A music data processing method according to claim 9, wherein:

said receiving step further receives recovery data for recovering music data not received due to a communications error, the recovery data containing third time information;

said storing step further stores said received recovery data temporarily; and said starting step further starts to process said stored recovery data when said second time information reaches said third time information.

11. A storage medium storing a program, which a computer executes to realize a music data process for a music data processing apparatus connecting to an external device via a public communications line and processing music data received from the external device via the public communications line, comprising the instructions for:

(a) receiving music data containing first time information representing first time from said external device via the public communications line;

(b) setting second time as second time information for the music data processing apparatus by subtracting a predetermined value from said first time;

(c) temporarily storing the music data received by said receiving step;

(d) periodically counting up said second time information;

(e) starting to process the music data temporarily stored in said storing step when said second time information reaches said first time information;

(f) checking a time sequential flow of music data temporarily stored in said memory; and (g) removing unnatural data from the flow of music data stored in said memory to prevent production of an unnatural musical tone, wherein said music data temporarily stored in said memory contains data related to volume of a musical tone, and said unnatural data is data which rapidly changes volume of a musical tone.

12. A storage medium storing a program according to claim 11, wherein:

said receiving step further receives recovery data for recovering music data not received due to a communications error, the recovery data containing third time information;

said storing step further stores said received recovery data temporarily; and said starting step further starts to process said stored recovery data when said second time information reaches said third time information.

* * * * *